United States Patent [19]
Dillet et al.

[11] Patent Number: 5,371,339
[45] Date of Patent: Dec. 6, 1994

[54] WELDING HEAD FOR MEASURING WELDING PARAMETERS AND THE APPLICATION THEREOF TO AUTOMATIC WELDING

[75] Inventors: Alain Dillet, Puteaux; Diane De Prunele, Paris, both of France

[73] Assignee: Commissariat a l'Energie Atomique, Paris, France

[21] Appl. No.: 904,652

[22] Filed: Jun. 26, 1992

[30] Foreign Application Priority Data

Jun. 28, 1991 [FR] France .................. 91 08110

[51] Int. Cl.$^5$ .............................. B23K 9/095
[52] U.S. Cl. ................................. 219/124.34
[58] Field of Search ............... 219/124.34, 130.01; 356/376

[56] References Cited

U.S. PATENT DOCUMENTS

| | | | |
|---|---|---|---|
| 4,578,561 | 3/1986 | Corby, Jr. et al. | 219/124.34 |
| 5,006,999 | 4/1991 | Kuno et al. | 219/124.34 |
| 5,104,216 | 4/1992 | Vokurka | 356/376 |

FOREIGN PATENT DOCUMENTS

| | | |
|---|---|---|
| 0214120 | 3/1989 | European Pat. Off. |
| WO86/04845 | 8/1986 | WIPO |

OTHER PUBLICATIONS

Patent Abstracts of Japan, vol. 11 No. 301(M628), Sep. 30, 1987, & JP-A-62-093093, Apr. 28, 1987, A. Nobuyoshi, "Weld Line Detecting Device".

Primary Examiner—Clifford C. Shaw
Attorney, Agent, or Firm—Oblon, Spivak, McClelland, Maier & Neustadt

[57] ABSTRACT

A welding head and process for measuring welding parameters, and the application thereof to automatic welding, which make it possible to measure welding parameters by use of a mechanism for viewing the welding scene. This welding scene is illuminated by the arc and the electrode and includes light spots projected by a laser source through a nozzle. The scene thus illuminated is transformed into images by the picture-taking mechanism which is able to determine the position of the spots and to determine the height of the welding head above the welding scene, by a method of triangulation. The picture-taking angle of the picture-taking mechanism can be modified to make it possible to determine several welding parameters. The welding head can be incorporated into an automatic welding system and can be applied in all high-technology industrial fields requiring automatic welding, such as the space, nuclear, or aeronautics fields.

21 Claims, 2 Drawing Sheets

WELDING HEAD FOR MEASURING WELDING PARAMETERS AND THE APPLICATION THEREOF TO AUTOMATIC WELDING

BACKGROUND OF THE INVENTION

1. Field of the Invention

This invention relates to a welding head making it possible to measure welding parameters thanks to means for viewing the welding scene.

2. Discussion of the Background

The invention has numerous applications in most high-technology industrial fields, such as the space, farm produce, aeronautics and nuclear fields. More specifically, it can be applied within an automatic welding system.

Conventional automatic welding systems systematically reproduce predefined sequences. Actually, the welding parameters tied, in particular, to the path followed by the welding head are first developed for nominal welding conditions; they are then recorded and used for all welds, regardless of the conditions in which the welding scene occurs. Nevertheless, these welding conditions are only very rarely constant, and the random disturbances they exhibit are generally not controlled. These disturbances such as, for example, positioning deviations, approach deviations, and deformations can be the cause of defects having unfortunate consequences (rejects, for example).

It is known, partly to correct some of these defects, to use sensors installed on preexisting welding systems. Such devices are described in the book "Robots de soudage, capteurs et adaptativite de trajectoire," [Welding robots, sensors and path adaptivity], in the series "Traite de soudage automatique" [Treatise on automatic welding], published by Hermes publishers under the signature of J. M. Detriche, in 1988.

SUMMARY OF THE INVENTION

The object of this invention is a welding head making it possible to measure the parameters essential for a quality weld. These measurements of welding parameters are performed by analyzing images taken of the welding scene by a picture-taking camera.

Incorporated into an automatic welding system, the parameters thus measured can be corrected almost instantaneously, thus preventing path deviations, penetration deviations and other deviations beyond their respective tolerated deviations.

More precisely, the object of the invention is a welding head comprising a torch with a welding electrode able to form a weld bead. It further comprises means able to form light spots on said welding zone, comprising the bath and the weld bead, and means for observing the welding zone, which comprise first means able to determine the position of the spots and second means able to perform the picture-taking of said welding zone.

Advantageously, the picture-taking means can be oriented relative to a perpendicular to a welding plane containing the welding zone, at one adjustable picture-taking angle at least, each of these angles making it possible to determine at least one welding parameter.

These picture-taking angles are about 15 and 45 degrees, respectively.

Further, the welding torch is inclined with respect to the perpendicular to the welding plane, the angle of this inclination being negative with respect to the picture-taking angles.

According to a feature of the invention, the welding head further comprises a welding nozzle able to allow the formation of light spots and picture-taking of the welding scene.

The nozzle itself comprises a wide body surrounding a lower part of welding torch, and a sleeve surrounding an upper part of the electrode, the lower end of said electrode being outside the nozzle.

According to an embodiment of the invention, the means for forming light spots on the welding scene are able to form two spots located on both sides, and in front of, the welding electrode.

According to another embodiment, the means for forming light spots on the welding scene are able to form three spots, with one located behind the electrode with respect to the welding direction and the two others on both sides, and in front of, the electrode.

Further, the means for forming the light spots comprise at least one source of monochromatic light that is optically coupled to as many optical fibers as there are spots, each of these fibers being connected to an optical projection device.

Advantageously, the means for observing the zone comprise a picture-taking camera equipped with a retractable spectral filter, centered on the monochromatic light of the means for forming the spots.

According to an embodiment, the second means for performing the picture-taking are, at the same time, the first means able to determine the position of the spots. According to another embodiment, the first means able to determine the position of the spots are independent position sensors.

This welding head uses a process consisting of taking a picture of a welding scene in progress, during which the welding bath is made and the weld bead is formed.

This welding head can be incorporated into an automatic welding system characterized in that it further comprises processing means connected to means for observing the welding zone and able to correct, in real time, the relative displacement between the torch and the welding zone and the welding parameters.

BRIEF DESCRIPTION OF THE DRAWINGS

Other characteristics and advantages will be better understood from the description that follows. This description is given by way of example, and is by no means limiting, with reference to the drawings in which.

DESCRIPTION OF THE PREFERRED EMBODIMENTS

This invention makes it possible to measure the parameters essential for obtaining a good quality of welding. The main parameters to be evaluated are the position of the joint, the width (or diameter) of the melting bath and the height of the welding head above the impact points of the spots. Other parameters are also able to be evaluated using this invention.

In this text, the term "head height" will be used to refer to welding in a flat position; in the case of welding in, another position (for example, rising vertical), it is clear that the distance between the head and the plane tangent to the welding surface is involved.

Figure 1:
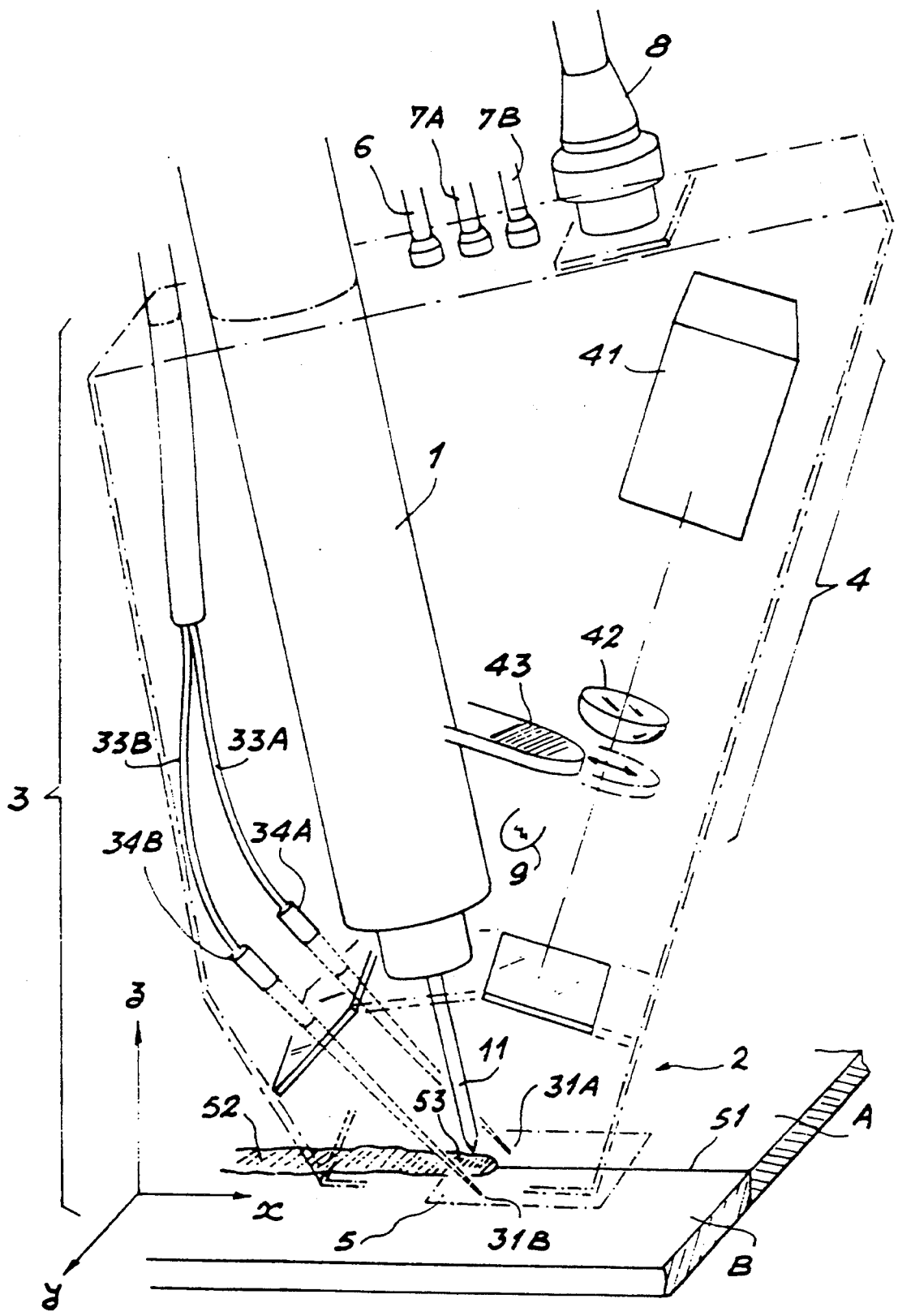
FIG. 1 diagrammatically represents the welding head according to the invention.

FIG. 1 shows a diagrammatic representation of the welding head with its main elements, which are welding torch 1, on which a special viewing nozzle 2 is fitted, means 3 for forming light spots and means 4 for picture-taking.

All of these elements of the welding head make it possible to view, on images taken continuously by the picture-taking means, the welding scene. Actually, this welding scene is located in visual field 5 of said picture-taking means, this field corresponding to a portion of welding plane (x, y) in which two parts A and B to be welded are located.

In this field 5 there can be seen joint 51, i.e., the joint between two parts A and B that are to be welded, bead 52, i.e., the result of melting bath 53 that provides the weld between said parts A and B, and tip 12 of a welding electrode.

Typically, this field 5 is 30×15 millimeters in size (30 mm along the welding axis), for an arc weld.

Welding torch 1, suited for welding under inert gas with a tungsten electrode (TIG), comprises, at its end near welding plane (x, y), a welding electrode 11. This electrode 11 ends in a tip 12 making it possible to create the electric arc that is at the origin of melting bath 53 being established between parts A and B.

Welding torch 1 is slightly inclined with respect to the perpendicular to welding plane (x, y) so as not to obstruct the welding scene for picture-taking means 4.

These picture-taking means 4 are integral with torch 1, thus making it possible to obtain a stable image. Thus, although torch 1 and the parts to be welded are in relative movement, the welding scene remains fixed with respect to welding torch 1. Further, said picture-taking means are inclined toward the front of the welding scene relative to the perpendicular to welding plane (x, y) and they comprise essentially a picture-taking camera 41.

According to the described embodiment of the invention, camera 41 is of the charge-transfer type (CCD) with stepwise, electronically variable exposure time. The possible dynamics varies from 1/50th to 1/1000th of a second. Thus it is the equivalent of a diaphragm control that can be remote-controlled, that is programmable and repetitive without the introduction of any mechanical element.

Besides camera 41, picture-taking means 4 comprise a standard objective lens 42, with focal length and extension adapted to field 5 to be observed. Typically, the focal length of this objective lens 42 is 50 millimeters and the ring extends by about 17 millimeters. For such a camera, when its adjustment of the electronic exposure dynamics is performed, the diaphragm of the camera remains constant.

Further, it is generally necessary to add, to the optical device comprising camera 41 and objective lens 42, a spectral filter 43 making it possible to model the chromatic contents of the light received by camera 41.

Actually, the arc necessary for welding is accompanied by an intense light, some of whose rays have a wavelength less than 600 nanometers; these rays would degrade the quality of images taken by camera 41. Spectral filter 43 in particular makes it possible to eliminate these rays. Actually, during the welding phases, the picture-taking system (i.e., camera 41) functions by so-called passive illumination, because the welding scene is lighted overall by the light emitted by the arc and the electrode.

This filter further makes it possible to improve the visibility of light spots 31 emitted by the means 3 for forming light spots when said filter 43 is interferential, centered on the wavelength of said spots 31.

Light spots 31 are elementary pinpoint spots, i.e., they are lighted points emitted by means 3 that are fixed with respect to welding torch 1, the term "elementary spot" being defined as the opposite of a "spot sweeping a surface."

In contrast, during observations without the presence of the arc, it is necessary to retract interferential filter 43, which provides too weak a transmission of light waves, even in the presence of very powerful additional lighting 9.

Advantageously, the bandwidth of filter 43 is adapted to balance out the relative visibility of the spots and the welding scene. This band is typically 1 nanometer.

The choice of a CCD model for camera 41 makes possible a better image quality because of the resistance of said camera to glare and its relative insensitivity to the severe electromagnetic conditions present a short distance from the arc.

Means 3 for forming light spots, mentioned above, comprise small helium-neon lasers of several milliwatts, not represented, each leading into a light-guiding fiber 33, itself ending in a small optical projection device 34. This optical device 34 is provided with fine adjustments making it possible to position light spot 31 at the place desired of observation field 5.

According to the embodiments of the invention, there are two or three light spots 31A, 31B. They are used to measure the height of the welding head above their points of impact, by a known triangulation method.

According to the preferred embodiment of the invention, two spots 31A and 31B are projected to the front of the welding scene, on both sides of its lengthwise axis, represented by the axis of abscissas x in the figure, in zones that are normally dark and clear.

Means for measuring the position of the spots make it possible to deduce, from the effects of illumination resulting from the projection of the spots, the position of said spots. In a first embodiment of the invention described in FIG. 1, these measurement means are merged with picture-taking camera 41.

According to another embodiment, these measurement means are position sensors, common in industry.

For example, analog PSD (position sensing device)-type circuits giving, by association with a suitable electronic device, the longitudinal position of the "center of gravity" of a light spot projected on a photosensitive linear array, are involved.

Generally, measurements of height by triangulation using the projection of spots on the welding scene make it possible to determine certain parameters mentioned above. More specifically:

—thus, at a spot 31, or by an average measurement at two spots, the height of the head without the arc can be measured to perform a preliminary vertical readjustment;

—with two spots 31A–31B, in the welding mode, either the difference in level of the approach on both sides of joint 51 can be measured (differential measurement), or, by an average measurement, the bulge, i.e., the excess thickness, of bead 52 forming during a welding with a filler wire can be measured, because the torch rises again in case of a bulge, if there is regulation of the arc voltage.

In an embodiment in which three spots are used, the third spot is placed at the rear, in the immediate vicinity of the tip of the electrode, with respect to welding direction x. This third spot makes possible either a direct measurement of the bulge of bead 52 behind the torch or an additional illumination of joint 51 to track said joint when camera 41 is located on an axis near the perpendicular to the welding plane.

In FIG. 1, gas feed 6 is also represented, the gas (namely a neutral protective gas, helium argon, . . . , in the embodiment described) being stored temporarily in the nozzle.

An electrical connection 8 provides a supply of energy to the welding head, a transmission of commands between said head and the command electronic device, and a video output connecting camera 41 to an exterior device from which the operator can display the images of the welding scene.

A water supply 7A and a water discharge 7B are connected to the cooling means, not represented, of the picture-taking means and of the torch.

Figure 2:
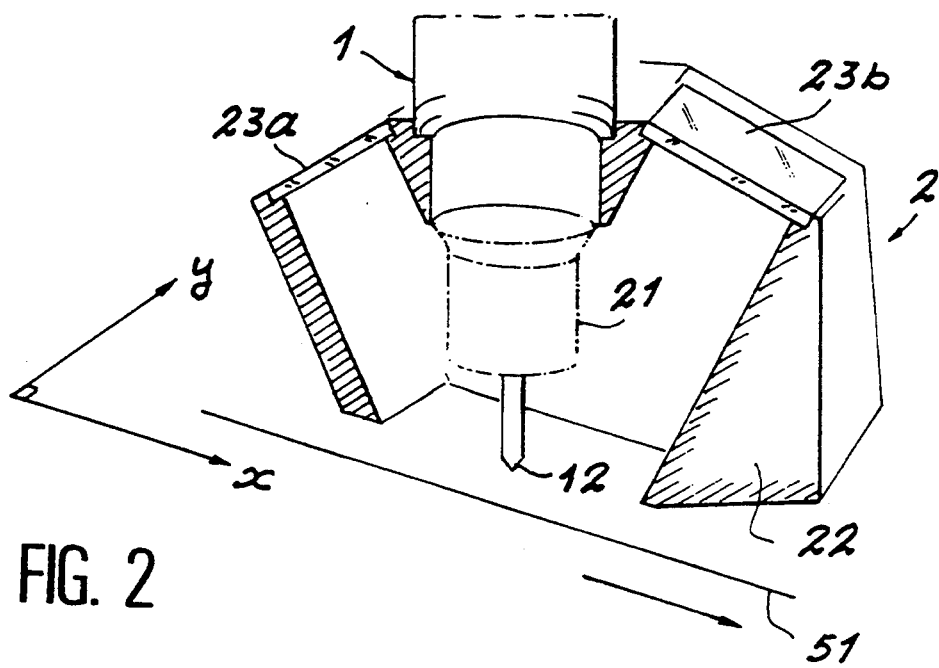
FIG. 2 diagrammatically represents, in a lengthwise section, the viewing nozzle used in the invention.

In FIG. 2, in a lengthwise section, special viewing nozzle 2, fitted on welding torch 1, has been represented. This nozzle 2 is suitable for optical paths for picture-taking and for spot projection, these paths converging in the immediate vicinity of tip 12 of the electrode.

For this, nozzle 2 comprises on the one hand a standard-type sleeve 21 closely surrounding electrode 11 and, on the other hand, a nozzle body 22 surrounding the entire end of welding torch 1.

Sleeve 21 of the nozzle is shorter in length than electrode 11 so that a relatively large part of said electrode projects from sleeve 21, this part of the electrode necessarily comprising the tip 12 of the electrode.

Nozzle body 22 surrounding the end of the torch is relatively broad, so as to contain sufficient gas at the level of the melting bath and of the bead being formed. According to an embodiment, nozzle body 22 is made, partly or integrally, of a transparent material, making it possible for optical picture-taking paths and spot projection paths to pass through nozzle 2 at 23a and 23b.

Figure 3A:
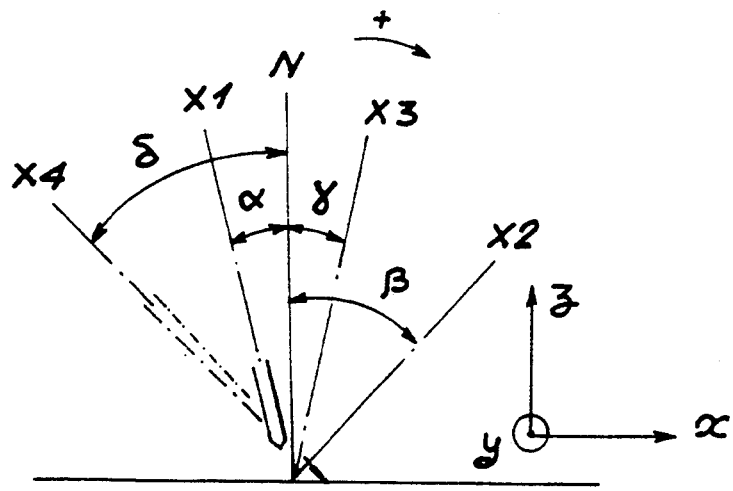
FIGS. 3A and 3B represent the angular orientations of various components of the welding head of the invention, for the preferred embodiment, in section along a plane parallel to the welding direction on the one hand, and along a plane perpendicular to said welding direction on the other hand.
Figure 3B:
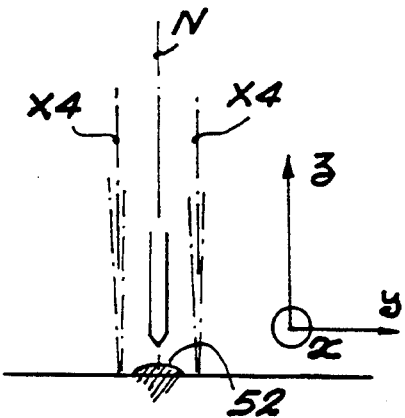

The geometry of the main orientations of the welding head is represented in FIGS. 3A and 3B.

More specifically, FIG. 3A shows a section parallel to welding direction x and FIG. 3B shows a section perpendicular to this same welding direction.

Thus, in FIG. 3A, the orientations of the welding head along a plane (x, z) perpendicular to the welding plane can be seen, i.e., for the preferred embodiment of the invention, the angular orientations assumed by the various elements of the welding head with respect to a perpendicular axis N to the welding plane (x, y) can be seen.

All the angular orientations are given with respect to reference to this perpendicular N of the welding plane.

Thus, axis X1 of the welding torch forms an angle of about −10 to −15 degrees with respect to perpendicular axis N. Actually, the welding torch is slightly inclined toward the rear, to make it possible for the camera to see the melting bath. The welding is then performed "out of perpendicular."

The picture-taking means, namely essentially the camera, observe the welding scene at a certain angle with respect to perpendicular axis N. This angle plays an important role in the possibility of exploiting the image obtained of the welding scene. Actually, at the wavelength used, the welding scene is essentially lighted by the tip of the electrode brought to a high temperature. The characteristics of the image obtained thus fundamentally depend on the effects of reflections and of semioblique lighting due to this illumination.

Thus two angular zones, each characterizing a different exploitation of the welding scene, can be determined:
— to study the joint in front of the melting bath (in the case where no filler wire is used), direction X2 of the camera must form an angle $\beta$ of about 45 degrees with perpendicular axis N; the joint is then represented, on the image, by a dark line on a bright background;
— to measure the width of the melting bath, the best observation is made for an angle $\gamma$ of about 15 degrees between optical axis X3 of the camera and perpendicular N.

In contrast, the height of the welding head can be measured for two angular orientations $\beta$ or $\gamma$ mentioned above, to which the angle of projection of the spots is added correlatively.

To make it possible to use the principle of measuring the height by triangulation, the spots must be projected at a sufficiently large angle with respect to axes X2 or X3 of the camera. However, said spots are not projected at too oblique an angle either, i.e., a small angle with respect to the welding plane, so as to sufficiently be diffused on the impact plane. An angle $\delta$ of 45 degrees between axis X4 of the projection of the spots and perpendicular axis N, with the welding torch projecting through the rear, fulfills the two above-mentioned conditions.

FIG. 3B represents the orientations of the welding head in a plane (y, z) perpendicular to the welding plane and does not contain the welding direction. This figure shows two axes X4 of the two light spots distributed symmetrically on both sides of the welding electrode, itself located above welding bead 52 along perpendicular axis N.

The welding head, as it has just been described, can be applied to an automatic welding system. For such an application, said welding head is fastened to the terminating end of a welding carrier such as a robot or a welding bench. It is also connected to image processing means making it possible to deduce, from said images, the values of the welding parameters and thus the values of the corrections to be made to the system.

Such a system provides remote control of numerous elements of the welding head and in particular provides the retraction of a spectral filter by remote control.

We claim:

1. Welding head for forming a weld bead which comprises:
    a torch with a welding electrode;
    a mechanism for forming a plurality of pinpoint and elementary light spots on a welding zone comprising a welding bath and the weld bead; and
    a mechanism for observing said welding zones which includes a first device to determine the position of the spots and a second device for taking pictures of said welding zone wherein the mechanism for forming a plurality of light spots forms two spots located on both sides of and in front of the welding electrode and includes an optical protection device and at least one source of monochromatic light coupled to three optical fibers, each of said fibers being connected to said optical projection device.

2. Welding head according to claim 1, wherein the device for taking pictures is orientable, with respect to a perpendicular axis to a welding plane containing the welding zone, at at least one adjustable picture-taking angle, making it possible to determine at least one welding parameter.

3. Welding head according to claim 2, wherein the second device for taking pictures takes pictures at angles of about 15 and 45 degrees, respectively, with respect to an axis perpendicular to the welding plane.

4. Welding head according to claim 1, wherein the welding torch is inclined at an angle of inclination with respect to the axis perpendicular to the welding plane, the angle of inclination being negative relative to the picture-taking angles.

5. Welding head according to claim 1, which comprises a welding nozzle for the formation of light spots and taking of pictures of the welding scene.

6. Welding head according to claim 5, wherein the nozzle comprises a wide body surrounding a lower part of the welding torch for the passage of optical paths for picture-taking and for spot formation, and a sleeve surrounding an upper part of the electrode, wherein a tip portion of said electrode is outside the nozzle.

7. Welding head according to claim 1, wherein said plurality of spots comprise three spots, one of said spots being located behind the electrode with respect to the welding direction, and the other two spots being located on both sides of, and in front of, the electrode.

8. Welding head according to claim 1, wherein the light source is a laser.

9. Welding head according to claim 1, wherein the mechanism for observing the zone comprises a picture-taking camera equipped with a spectral filter, centered on the monochromatic light, which is movable towards and retractable from the camera.

10. Welding head according to claim 1, wherein the second device for taking pictures includes the first device to determine the position of the spits.

11. Welding head according to claim 1, wherein the first device to determine the position of the spots comprises a plurality of independent position sensors.

12. Automatic welding system comprising a welding head according to claim 1, which comprises a processing mechanism, connected to said mechanism for observing the welding zone, for correcting, in real time, the relative displacement between the torch and the welding zone and the welding parameters.

13. Automatic welding process used by the welding head having a torch with a welding electrode, an optical protecting device with optical fibers for forming a plurality of pinpoint and elementary light spots on a welding zone comprising a welding bath and a weld bead, and a mechanism for observing the welding zone which includes a first device to determine the position of the spots and a second device for taking pictures of the welding zone, which comprises:

taking a picture of a welding scene, during which a melting bath is made and a weld bead is formed;
forming a plurality of light spots on the welding scene wherein two of the plurality of spots are located on both sides of and in front of the welding electrode; and
projecting the light spots from the optical projection device via said optical fibers.

14. The process as claimed in claim 13, which comprises orienting the device for taking pictures, with respect to a perpendicular axis to the welding plane containing the welding zone, at at least one adjustable picture-taking angle so as to determine at least one welding parameter.

15. A welding process as claimed in claim 14, wherein the at least one adjustable picture-taking angle comprises two angles of about 15° and 45°, respectively, with regard to an axis perpendicular to the welding plane.

16. The automatic welding process of claim 13, which comprises inclining the welding torch at an angle of inclination with respect to an axis perpendicular to the welding plane wherein the angle of inclination is negative relative to the picture-taking angles.

17. The automatic welding process as claimed in claim 16, which comprises surrounding a lower part of the welding torch with a wide body nozzle for the passage of optical paths for picture-taking and spot formation, surrounding an upper part of the electrode with a sleeve, and locating a tip portion of the electrode outside the nozzle.

18. The automatic welding process as claimed in claim 13, wherein the plurality of light spots comprise three spots, one of the spots being located behind the electrode with respect to the welding direction and the other two spots being located on both sides of and in front of the electrode.

19. An automatic welding process as claimed in claim 13, which comprises using a laser as a light source for the light spots.

20. An automatic welding process as claimed in claim 13, which comprises a spectral filter and which includes moving the spectral filter towards and away from the camera so as to filter light received by said device for taking pictures.

21. An automatic welding process as claimed in claim 13, which comprises correcting, in real time, the relative displacement between the torch and the welding zone and the welding parameters.

* * * * *